Oct. 18, 1966 O. M. LILIEN ETAL 3,280,252

SYSTEM FOR ENGRAVING A RECORD FROM MULTIPLE ORIGINAL COPIES

Filed Sept. 5, 1963 5 Sheets-Sheet 1

INVENTORS
Otto Magnus Lilien
Karl-August Springstein
BY
Beaman & Beaman
attys

INVENTORS
Otto Magnus Lilien
Karl-August Springstein
BY
Beaman & Beaman
attys

INVENTORS
Otto Magnus Lilien
Karl-August Springstein
BY
Beaman & Beaman
attys

Oct. 18, 1966 O. M. LILIEN ETAL 3,280,252

SYSTEM FOR ENGRAVING A RECORD FROM MULTIPLE ORIGINAL COPIES

Filed Sept. 5, 1963 5 Sheets-Sheet 4

INVENTORS
Otto Magnus Lilien
Karl-August Springstein
BY
Beaman & Beaman
Attys

INVENTORS
Otto Magnus Lilien
Karl-August Springstein
BY
Beaman & Beaman
attys

United States Patent Office 3,280,252
Patented Oct. 18, 1966

3,280,252
SYSTEM FOR ENGRAVING A RECORD FROM MULTIPLE ORIGINAL COPIES

Otto M. Lilien, Bendestorf, near Hamburg-Harburg, and Karl-August Springstein, Hochfeld, Germany, assignors to Axel Springer & Sohn, Hamburg, Germany Filed Sept. 5, 1963, Ser. No. 306,821
Claims priority, application Germany, Sept. 8, 1962, S 81,367
7 Claims. (Cl. 178—6)

Figure 1:
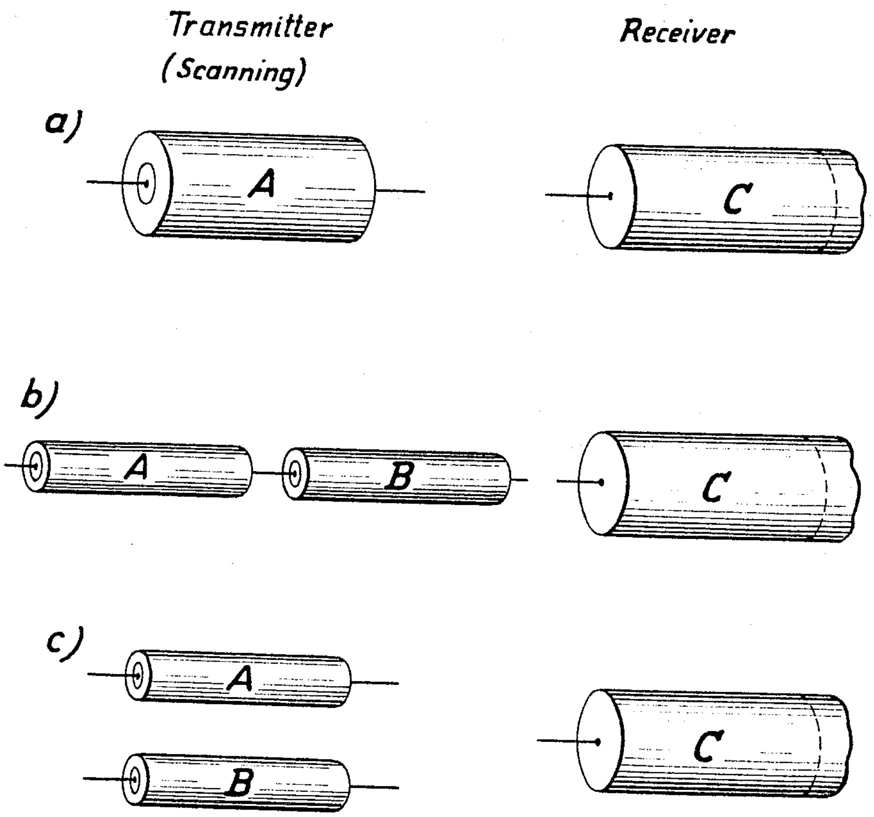

The invention relates to a process of photoelectrically scanning printing originals tensioned on an original cylinder for the purpose of transferring the result of this scanning operation onto a rotogravure cylinder for the purpose of engraving it.

The conversion of light signals which are generated by continuous or intermittent illumination or transillumination of originals which may be either positives or negatives and either black and white or coloured, is effected in a photoelectric process (photo semi-conductors, photocells, secondary electronic multiplier SEV). In this operation, the original is scanned either spirally (rotating cylinder) or following the shape of a meander (reciproacting plane table) or only in one direction in a to and fro movement. The scanning apparatus is as a rule equivalent to the receiver apparatus from a constructional viewpoint.

In modern mass production operation, it is generally not only one single original that is transferred but all at once a plurality of originals which are to be accommodated on one and the same printing form (rotogravure cylinder). In this operation, the individual originals are composed to form groups (arrangements) in a manner to correspond to the pages of the printed product. Consequently, there will result a regular and constantly repeating subdivision of the printing form in the order (arrangement) of the originals. The printing form is thus subdivided into several smaller cylinders of equal length when producing periodicals. The cylinder surface of these smaller cylinders is again subdivided into several smaller fields in dependence upon the pages or double pages. It is near at hand to use as carriers for the copy constructionally the same formation as will have to be available anyway for the production of the printing form, that means as a rule a rotogravure cylinder. In the conventional method of making rotogravure cylinders even the original cylinder and the printing cylinder are one and the same object. The originals are arranged on the printing cylinder in the form of exposed pigment paper. The image of the original which is transformed into cells of more or less depth and of equal size or of equal depth with different sizes (or a combination of both) of etched material is formed purely chemically especially in the well-known etching process directly beneath the originals in the skin of the cylinder.

Such rotogravure cylinders are rather heavy in weight for mechanical reasons and reasons connected with printing techniques (some hundred kilos). Therefore, if one uses a normal unetched cylinder as an element to arrange the originals because it is (a) present and (b) is practically of exactly the same size with the printing cylinder to be processed in particular as regards its periphery, this will positively result in the necessity to use a robust and thus voluminous and heavy scanning apparatus. A transfer apparatus built up on such principles may be carried into practice technically reasonably only in such a manner that the scanning unit and the receiving unit (that one in which thus the printing form is finally created) are realized in the form of two sepaarte aggregates which are coupled to each other either mechanically or electrically or electromechanically. In this case it is a prerequisite that both aggregates are running exactly synchronously. In order to save time in the transferring process, the cylinder length is subdivided into equidistant lengths which is near at hand because of the subdivision of the original pages or double-pages, respectively, of the periodicals. Therefore, the cylinder is not transferred continuously from its beginning to its end as a whole but the cylinder portions, for instance five of them, are simultaneously and synchronously scanned and transferred. Thus, the entire transferring time is reduced to the fraction in correspondence with the number of cylinder portions transferred at a time.

The known scanning devices of the original cylinder for the purpose of transferring the result of this scanning onto the engraving units for engraving rotogravure cylinders are thus very heavy in weight and costly with respect to both place requirement and manufacture. To this it must be added that the individual operations are interfering with one another when placing the originals on the long cylinder.

In accordance with the invention, these shortcomings are overcome in that the length of the original cylinder constitutes only a fracture of the length of the rotogravure cylinder so that to engrave a rotogravure cylinder a plurality of original cylinder sections are scanned.

Thus, instead of the voluminous and heavy scanning cylinder, several shorter cylinders of equal periphery are employed in accordance with the invention. These shorter cylinders may then right from the beginning be manufactured to be considerably lighter in weight for they are not needed in the printing operation and are only intended to receive the original. This brings about numerous advantages concerning manufacture and, in particular, printing technique, which may be summarized as follows:

(1) In connection with a non-subdivided original cylinder, two machines of an order of size of 5 tons of weight each must be erected. This cannot be practically realized because of the carrying capacity of the ceilings (and floors, respectively) available. It is already met with sufficient difficulty to find a suitable place of erection for the absolutely indispensable engraving unit (about 5 tons).

(2) The manufacture of large scanning machines is more difficult, more expensive (special production machines of greater dimensions) and requires longer periods of delivery (for instance castings, extended machining etc.). The sum of the prices of several smaller scanning machines is less then that of a great scanning machine (simplification of production by series production).

(3) In order to avoid an interruption in production in case of failure of one scanning machine (defect) a spare scanning machine must be available. If several smaller scanning aggregates are available, it is highly improbable that they should all of them fail simultaneously. It will therefore suffice if one small aggregate is kept as a spare. Consequently, the means necessary to be invested for an entire plant (that means including the necessary spare aggregates) are substantially lower when using small scanning aggregates.

(4) Such machines must be erected in such a manner that they are not affected by vibration. Suitable foundations are a problem if such weights are involved.

(5) Such engraving machines are as a rule intended to be inserted in a production process that is already in existence. Thus, they can practically not be erected in a place where new foundations can be procured but they must be erected in that place where the net of tracks for the transport carts of the printing cylinders which is already in existence, is available.

(6) To be in a position to work economically, several original cylinders must be available and storing facilities for them be provided. During each production while it is on, the next edition must be prepared.

(7) In the production of periodicals, for reasons of topicality, the timely sequence in the supply of the scanning originals can never be controlled in a manner as would be desirable for the purely technical processes. When charging a great original cylinder, therefore, it must be waited until the last "actual" original is available. With short and small scanning cylinders, all of them except for that one on which the last original has to be placed may be completely arranged. This means a gain of time in practical operation by which the topicality may be still improved. As only the last original solely remains to be arranged it may be supplied still later by the amount of time gained (owing to the fact that the remaining originals have already been finished as far as time is concerned) which means a further gain in topicality.

(8) In case of (mechanical) damage of an original cylinder, this cylinder must as a rule be re-machined all over its surface. This is applicable to both long and short cylinders. But the short cylinders are in any case easier to machine than long ones (corresponding machines therefore) and short cylinders are faster available again for the production process if such a process becomes necessary.

(9) Short cylinders are naturally offering smaller attacking possibilities with respect to influences from outside occurring in a production process (for instance damages) and are easier to handle and transport (without any assistance by machines, travelling cranes).

(10) A long original cylinder may practically be charged with originals by only one operator because several persons would hinder each other when working simultaneously. As the application of the originals is reasonable only if it is done very carefully, this operation requires a considerable amount of time. When using shorter cylinders which may each of them be arranged separately, the originals may be applied to each original cylinder simultaneously by several persons, which means an economy of time.

(11) Short cylinders may be stored vertically, if desired or required, which is practically impossible with long cylinders.

(12) Short cylinders may be operated vertically in the scanning apparatus which brings about a saving in space requirement when several scanning apparatuses are driven synchronously.

(13) What is furthermore to the credit of small original cylinders is the fact that small masses may be synchronized more easily than great masses (less technical costs, and consequently lighter weight, lower price and increased safety in operation).

(14) Smaller scanning aggregates may be made, for instance, in the form of a writing desk. Smaller scanning aggregates may therefore be erected in different departments which are locally separated from each other (for instance programs—news—feuilleton etc.).

(15) When repeating certain pages of the periodical (for instance advertisements) and when using the same original in regionally different editions, always the same short scanning cylinder may be used or it may be stored readily arranged to be used another time. With long cylinders this is principally not possible because the better part of the stock or originals must be changed.

FIGURES 1–5 are illustrative of the invention.

As in a modern production operation always quite a few pages (or double pages, respectively) are transferred onto one printing form, it is possible, in accordance with the invention to subdivide a short original cylinder still further (please see FIG. 1). Instead of one short scanning cylinder A, on which for instance two double-pages may be arranged (FIG. 1*a*) two cylinders A and B of the same length but only half the diameter are employed. These original cylinders A and B may be disposed either on one axle (FIG. 1*b*) or they may be arranged in separate aggregates (FIG. 1*c*) in which latter case they must be driven synchronously.

On the receiver side, a cylinder C is employed such as is generally used in normal production. Its length is a multiple of that of a short original cylinder. This cylinder C must have a circumference equal to the sum of the peripheries of the original cylinders A and B. Furthermore, the speed of revolution of the cylinder C must be half the speed of an original cylinder.

This type of subdivision is not restricted to only two partial original cylinders per section. The individual sections of the rotogravure cylinder may also be subdivided to a still greater extent in that for instance three or four partial original cylinders are provided for each rotogravure cylinder section. In accordance with the invention, therefore, the diameter of the partial original cylinders is selected to be smaller than that of the rotogravure cylinder in which the sum of the diameters of the partial original cylinders is equal to the diameter of the rotogravure cylinder, and the speed of rotation of the rotogravure cylinder is less by $1/n$ than be speed of rotation of the partial original cylinders which is the same for each of these partial cylinders, the number of which is equal to $n$.

In this connection it is recommended, to allot to each partial cylinder a scanning system and to each rotogravure cylinder so many engraving systems equally distributed on its periphery as there are partial original cylinders available for said section; during one revolution of the rotogravure cylinder, the scanning system of a certain partial original cylinder will then be switched continuously onto the individual engraving systems so that each engraving system engraves its continuous track. In this manner an additional reduction of the size of the partial original cylinders is effected.

Figure 2:
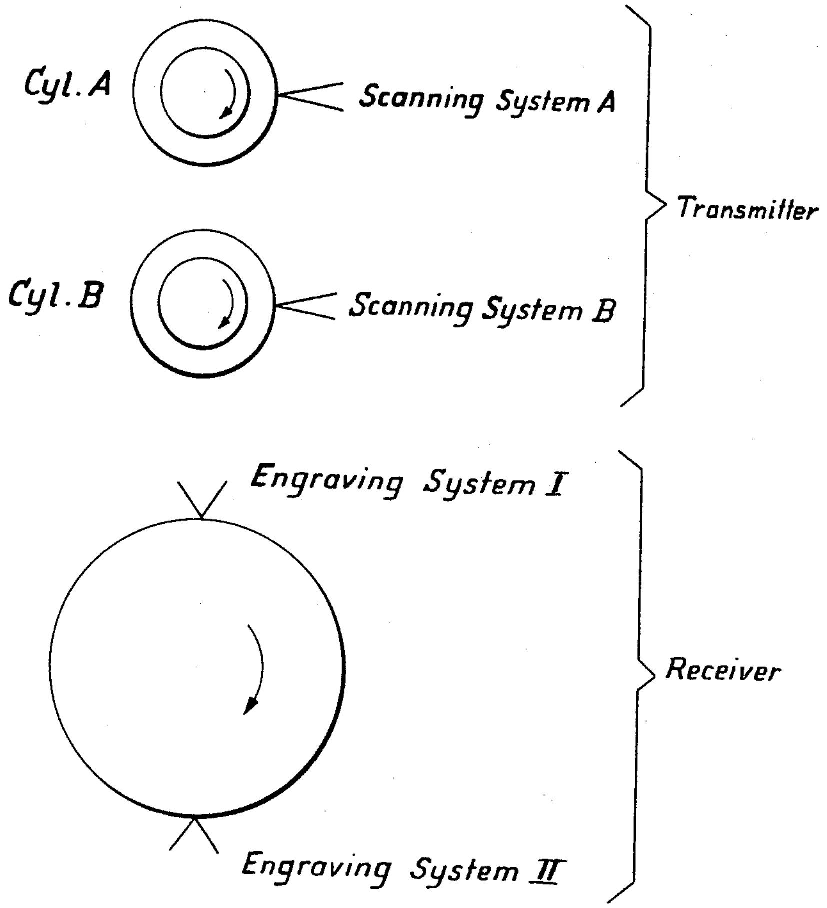
Figure 3:
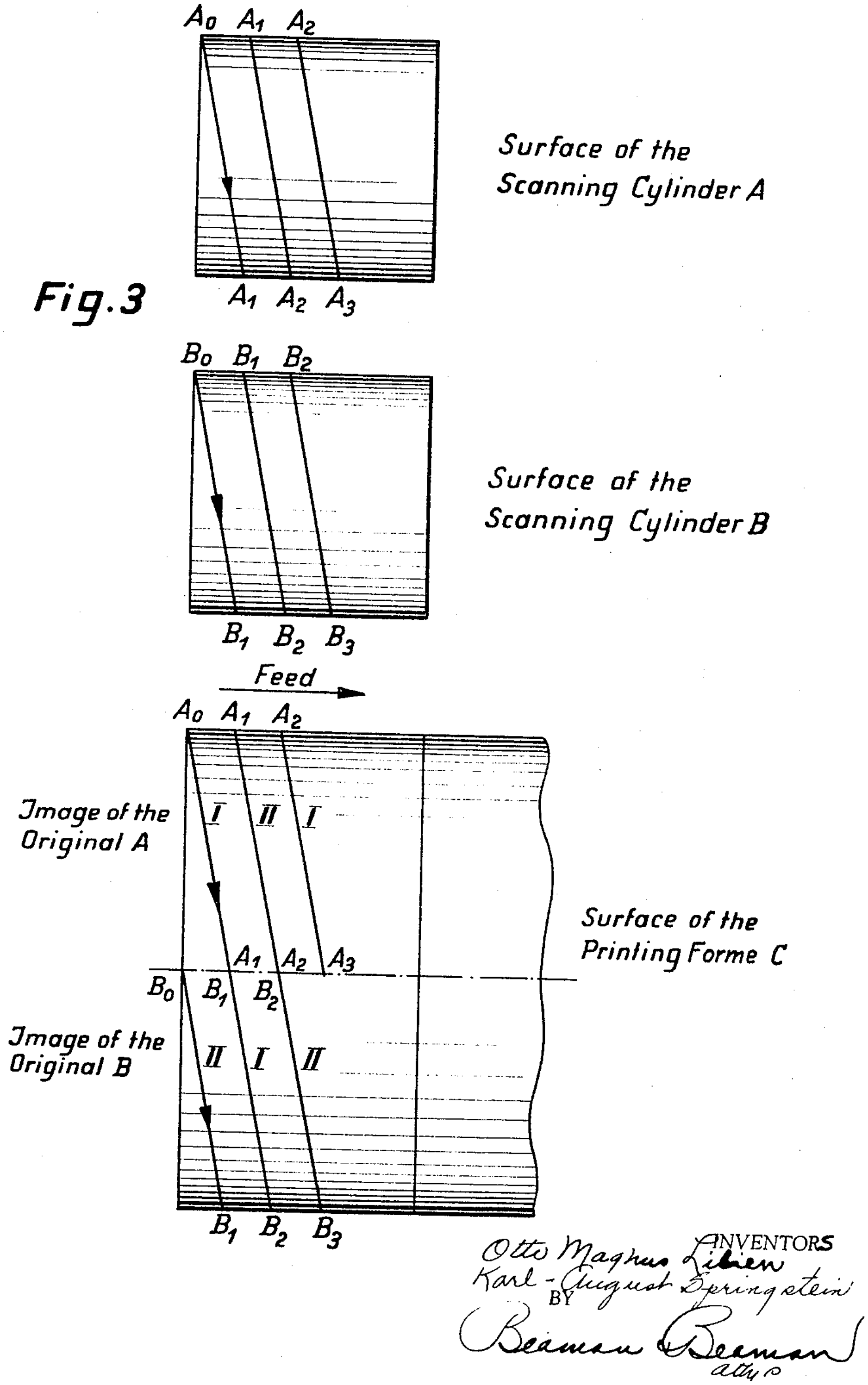

The cooperation between the transmitter side (scanning operation) and the receiver side (for instance engraving operation) will be explained in the following with the aid of FIG. 2. On the receiver side, for instance, two engraving systems I and II are employed. The feed which is effected longitudinally (axially) of the scanning systems and the engraving systems is taking place uniformly and with the same speed. If one of the two scanning cylinders A or B has completed 1 total rotation, then each one of the two scanning systems A or B will have scanned a helical line. (Please compare FIG. 3.)

Figure 4:
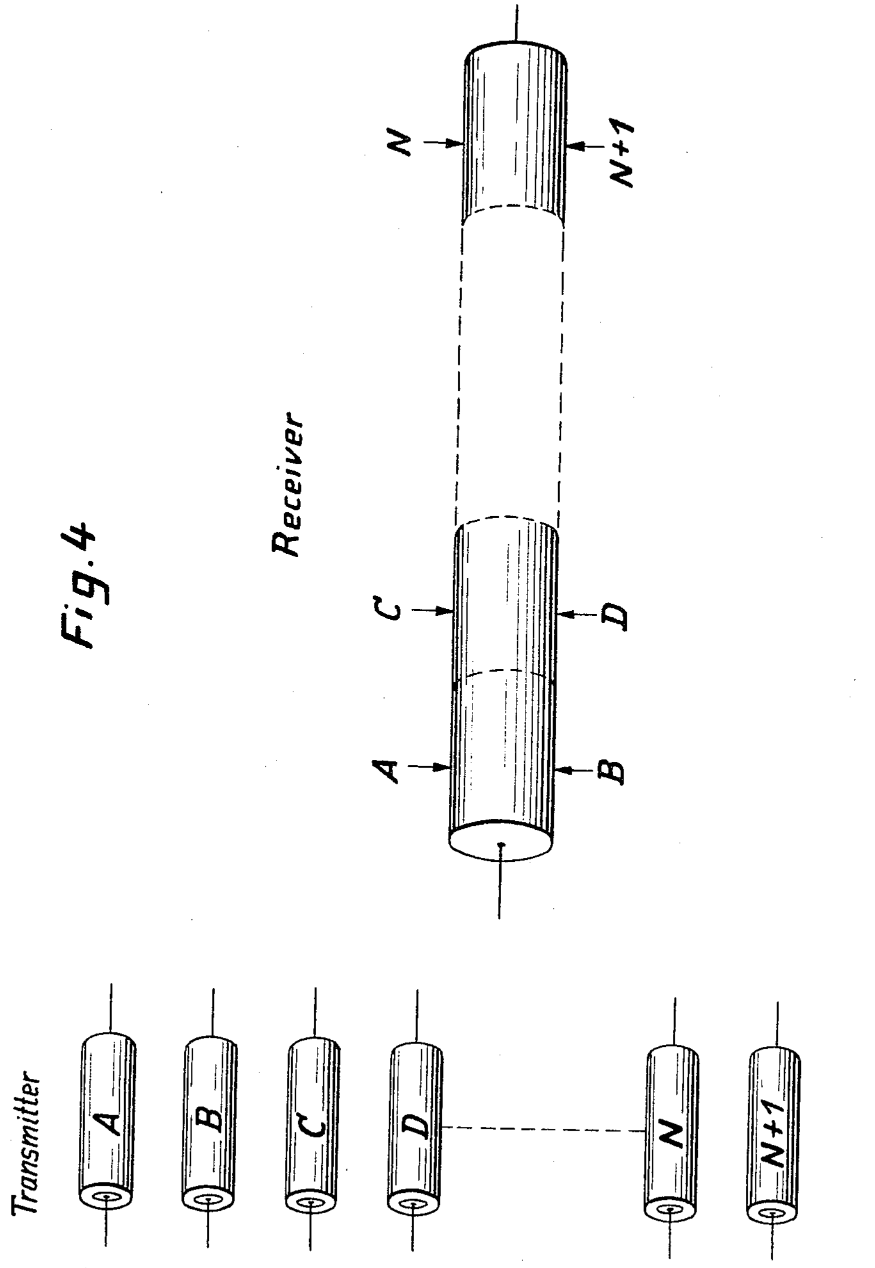
Figure 5:
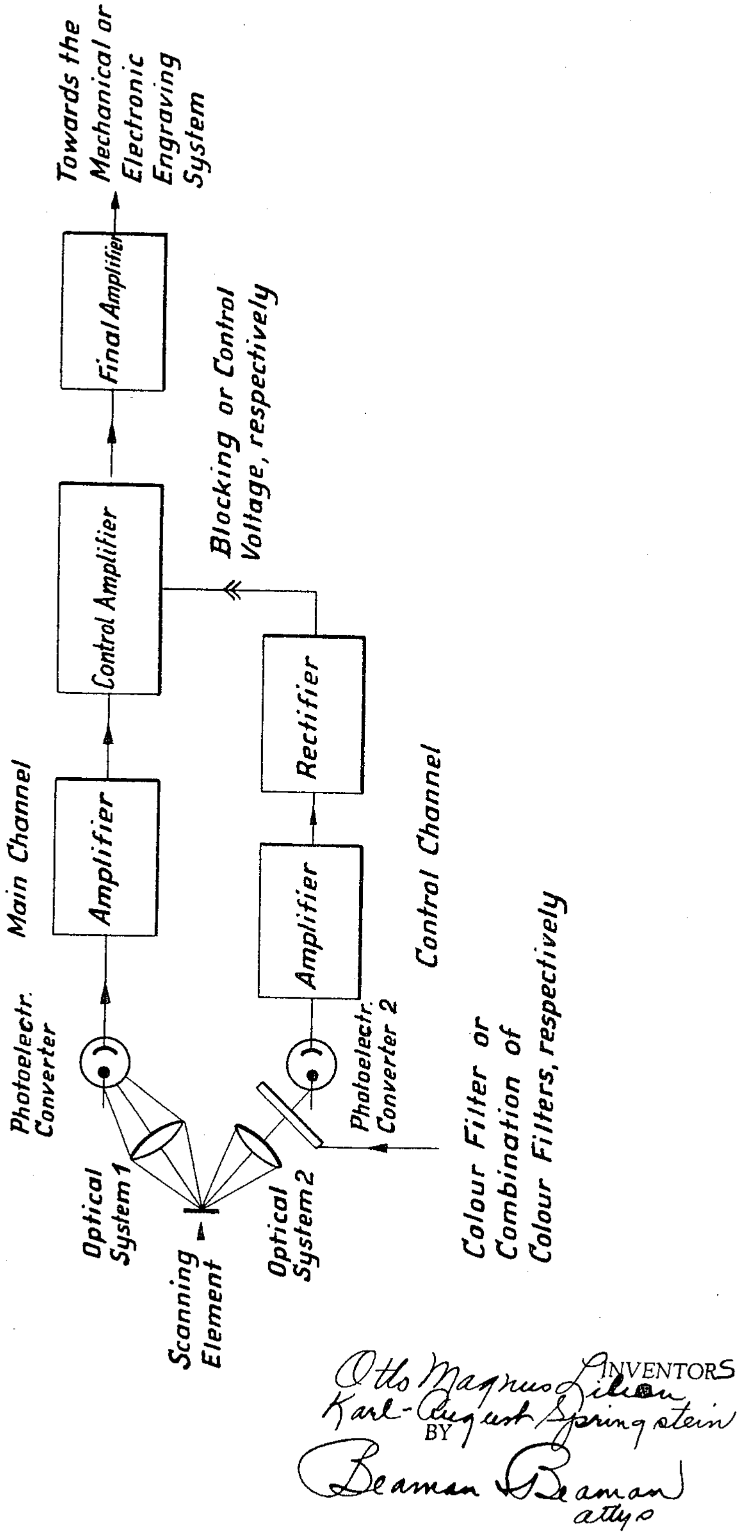

The arrangement must now be operated in such a manner that the scanning systems A and B are alternately feeding the engraving systems I and II. If thus the scanning A while carrying out the first helical line feeds the engraving system I, the same scanning system A will have to feed the engraving system II during the time the second helical line is produced. During the time the third helical line of the system A is carried out, the engraving system I will again be fed etc. This corresponds equally with respect to the scanning system B. In this manner, each engraving system engraves its continuous track. It is, however, biased by the one or other original in dependence upon the cylinder half on which it is just present. The switching of a scanning system to the one or other engraving system may be effected in a manner known per se by mechanically operated switches or by so called electronic switches in synchronism with the rotation of the cylinder. This process may practically be extended to as many original cylinders as is desired. An example is shown in FIG. 4. All the original cylinders A to $N+1$ are driven synchronously. After each rotation of the original cylinder the bias of the associated pair of engraving systems is changed. With the known devices, also the removal of cutting edges between the individual originals on the original cylinder is a problem that can be controlled only with difficulty. With the aid of the invention, the removal of these cutting edges may be obtained in an extremely simple manner. In accordance with the invention, the cutting edges on the original cylinders are for this purpose covered by coloured masks. Such masks may for instance be mounted on the original or pasted on. The original is then scanned not only by the main photoelectric scanning device but also by an auxiliary scanning device which is responsive only to the colour of the mask. This may be obtained for instance by arranging in front of the auxiliary photoelectric scanning device a corresponding colour filter. As soon as the auxiliary photoelectric scanning device now perceives colour, that means is excited, the electric signal of the main photoelectric scanner will be controlled to go down to zero or any other value which, with no colour signal present, corresponds to the electrical value white, that means absolutely transparent. The manner in which this process is carried out is shown in the block diagram in FIG. 5.

Another disadvantage of the known devices consists in that they are practically in a position to scan only reflection copy. Contrary to this, however, the intermediate originals used for the rotogravure process have so far been made generally in the form of transparent diapositives. This circumstance renders the introduction of the so far known scanning devices difficult to a considerable degree.

In accordance with the invention, this disadvantage is removed in that the sectional original cylinders are formed of hollow cylinders made of glass or any other suitable transparent material which are illuminated from their center axis and in that the originals are made in the conventional manner in the form of transparent diapositives.

The well thickness and nature of the surface of such small transparent cylinders are absolutely suitable to meet the high requirements of photoelectric scanning processes. These cylinders may be made with the short lengths provided in accordance with the invention in a technically unobjectionable and economical manner. The manufacture of the sectional original cylinders made of transparent material makes then furthermore possible the manufacture of the scanning copy as transparent diapositives.

The manufacture of these transparent diapositives for carrying out the rotogravure process is generally known and usual. It is thus obtained by the invention that the manufacture of the scanning copy need not be changed at all. It is therefore the scanning device combined with the device for engraving the rotogravure cylinder that makes possible at all the utilization of the advantages of such a photoelectric scanning and engraving operation as a whole in which now above all those process steps are eliminated which are in connection with the treatment of the pigment paper.

The surface of the cylinder on the receiver side may be made in such a manner that it may be magnetized or may be covered with a magnetizable foil (for instance such material as is usual with tape recording operations or electrical television recording operations). Instead of the engraving systems, magnetizing systems will then have to be employed. In this manner, an image or text storage which is scanned on the transmitter side may be stored electromagnetically in the original size. If the electrical signal which feeds the magnetizing systems is in addition supplied in the form of impulses with the aid of known processes, a screened storage will take place. This screened storage may in addition be effected in a quantitized way, that means the individual electric impulses may have associated thereto only discrete (but defined) amplitudes in accordance with well-known processes. This brings about the advantage that with a rescanning of the storage cylinder, impulse transfer processes may be employed immediately and directly which are advantageous with respect to a long distance transmission which is little susceptible to interference.

If it is intended to store electrically the whole of the originals available, which are to be transferred onto a printing cylinder, for instance on a magnetic tape recorder, this will be possible in connection with a long cylinder only if all the originals are simultaneously available. With short original cylinder, the contents of the originals of each individual cylinder may be stored independently of the other cylinders. That means: If the originals are supplied one after the other from the production process, the storage may be started already with the first supply. In this case, the system will be less costly as regards the electronic means than would be the case if all the originals were to be stored simultaneously.

This principle of storing the contents of the originals may be fully applied in the same sense also to the problem of long distance transmission.

The simultaneous electrical long distance transmission of the total storage of originals requires in accordance with the laws of the information a greater transfer band width (range of frequencies) than the transfer of a smaller storage of originals. The transfer band width is proportional to the content of informations. In so far, the long distance transmission of originals (be it for storage or printing form production) is a question governed by costs and thus economy.

What we claim is:

1. A system for engraving a rotogravure printing cylinder according to printing original copies, comprising a printing cylinder and a plurality of original copy cylinders on which said printing original copies being fixed, means for photoelectric scanning said printing original copies on said original copy cylinder during rotating said original copy cylinders, means for rotoengraving said printing cylinders during rotating said printing cylinder according to the results from said scanning operation, means for transferring the results from said scanning operation to said roto-engraving means, said original copy cylinders having a length constituting only a fraction of the length of said printing cylinder so that to engrave said printing cylinder said plurality of said original copy cylinders will be scanned.

2. A system for engraving a rotogravure printing cylinder according to printing original copies comprising a printing cylinder and a plurality of sets of original copy cylinders, each of said sets comprising a plurality of said original copy cylinders, said printing original copies being fixed on said original copy cylinders, means for photoelectric scanning said printing original copies on said original copy cylinders, during rotating said original copy cylinders, means for rotoengraving said printing cylinder during rotating said printing cylinder according to the results from said scanning operation, means for transferring the results from said scanning operation to said roto-engraving means, the original copy cylinders of each set having a length constituting only a fraction of the length of said printing cylinder so that to engrave said printing cylinder the original copy cylinders of said plurality of sets will be scanned, said original copy cylinder having a diameter smaller than that of said printing cylinder, the sum of the diameters of the original copy cylinders of each of said sets being equal to the diameter of said printing cylinder, the speed of rotation of said printing cylinder being less by $1/n$ than the speed of rotation of each original copy cylinder present in a number$=n$ of each of said sets, all original copy cylinders of each of said sets having the same speed of rotation.

3. A system for engraving a rotogravure printing cylinder according to printing original copies comprising a printing cylinder and a plurality of sets of original copy cylinders, each of said sets comprising a plurality of said original copy cylinders, said printing original copies being fixed on said original copy cylinders, means for photoelectric scanning said printing original copies on said original copy cylinders, during rotating said original copy cylinders, means for rotoengraving said printing cylinder during rotating said printing cylinder according to the results from said scanning operation, means for transferring the results from said scanning operation to said roto-engraving means, the original copy cylinders of each set having a length constituting only a fraction of the length of said printing cylinder so that to engrave said printing cylinder the original copy cylinders of said plurality of sets will be scanned, said original copy cylinder having a diameter smaller than that of said printing cylinder, the sum of the diameters of the original copy cylinders of each of said sets being equal to the diameter of said printing cylinder, the speed of rotation of said printing cylinder being less by $1/n$ than the speed of rotation of each original copy cylinder present in a number$=n$ of each of said sets, all original copy cylinders of each of said sets having the same speed of rotation, each original copy cylinder of one of said set having said means for photoelectric scanning said printing original copies, said printing cylinder having for each section of length coordinated with one of said sets a plurality of said engraving means according to the plurality of original copy cylinders of said set, said engraving means being uniformly spaced about the periphery of said printing cylinder, during each rotation of said printing cylinder said scanning means of the original copy cylinders of said set being switched cyclicly onto said engraving means of said printing cylinder so that each engraving means engraves a continuous track consisting during each rotation of single track portions scanned one after the other from the original copy cylinders of said set.

4. A system for engraving a rotogravure printing cylinder according to printing original copies, comprising a printing cylinder and a plurality of original copy cylinders on which said printing original copies being fixed, first means for photoelectric scanning said printing original copies on said original copy cylinders during rotating said original copy cylinders, means for rotoengraving said printing cylinder during rotating said printing cylinder according to the results from said scanning operation, means for transferring the results from said first scanning operation to said rotoengraving means, said original copy cylinders having a length constituting only a fraction of the length of said printing cylinder so that to engrave said printing cylinder said plurality of said original copy cylinders will be scanned, coloured masks for covering the cutting edges of said printing original copies on said original copy cylinders, second means for scanning said printing original copies on said original copy cylinders during rotating, said second scanning means being sensitive to the colour of said masks and being connected to said first scanning means so that by sensation of said second scanning means a scanning result corresponding to the photoelectrical value "nothing" will be transferred to said roto-engraving means of said printing cylinder.

5. A system according to claim 1 wherein said original copy cylinders consisting of transparent material, means for illuminating said transparent original copy cylinders from inside, said printing original copies consisting in a manner known per se of transparent diapositives.

6. A system according to claim 2 wherein said original copy cylinders consisting of transparent material, means for illuminating said transparent original copy cylinders from inside, said printing original copies consisting in a manner known per se of transparent diapositives.

7. A system according to claim 4 wherein said original copy cylinders consisting of transparent material, means for illuminating said transparent original copy cylinders from inside, said printing original copies consisting in a manner known per se of transparent diapositives.

References Cited by the Examiner

UNITED STATES PATENTS 3,233,037 2/1966 Foll ................ 178—5

DAVID G. REDINBAUGH, *Primary Examiner.*

H. W. BRITTON, *Assistant Examiner.*